United States Patent [19]

Hill

[11] Patent Number: 5,003,757
[45] Date of Patent: Apr. 2, 1991

[54] CLOSE-TRIM MOWER DEFLECTOR

[75] Inventor: Amos G. Hill, Orangeburg, S.C.

[73] Assignee: White Consolidated Industries, Inc., Cleveland, Ohio

[21] Appl. No.: 468,755

[22] Filed: Jan. 23, 1990

[51] Int. Cl.$^5$ ............................................. A01D 34/67
[52] U.S. Cl. ..................................... 56/17.4; 56/320.1; 56/DIG. 9; 56/320.2
[58] Field of Search ................. 56/17.4, 17.5, 320.1, 56/328.1, 202, DIG. 9, DIG. 20, 320.2; 403/53, 58, 73, 111, 119, 152

[56] References Cited

U.S. PATENT DOCUMENTS

| | | | |
|---|---|---|---|
| 2,532,996 | 12/1950 | Clark et al. | 403/111 X |
| 3,706,190 | 12/1972 | Taub | 56/13.4 |
| 4,014,159 | 3/1977 | Piazza | 56/202 |
| 4,078,365 | 3/1978 | Ingalls | 56/328.1 |
| 4,281,848 | 8/1981 | Youngers | 280/494 |
| 4,445,312 | 5/1984 | Cartner | 56/15.5 |
| 4,726,178 | 2/1988 | Mallaney et al. | 56/202 |
| 4,897,988 | 2/1990 | Schweitz et al. | 56/202 |

Primary Examiner—Ramon S. Britts
Assistant Examiner—Terry Lee Melius
Attorney, Agent, or Firm—Pearne, Gordon, McCoy & Granger

[57] ABSTRACT

A close-trim discharge deflector for a lawn mower is disclosed. The deflector is pivotable both horizontally and vertically at its leading edge using a T-shaped swivel. The shaft of the T provides one hinge pin and the cross piece incorporates the other. A single spring attached between the mower deck and the deflector biases the deflector in a horizontal and extended position. During mowing, objects that contact the deflector either swing it back or up out of the way. Also, the deflector may be swung up out of the way of a bagger attachment. In addition, the deflector may be latched back to take up less storage space.

10 Claims, 5 Drawing Sheets

CLOSE-TRIM MOWER DEFLECTOR

BACKGROUND OF THE INVENTION

The invention relates generally to a mowing device such as a lawn mower/tractor and in particular to a movable deflector or discharge chute therefor.

Lawn tractors and lawn mowers often have a side-located discharge port for the debris cut/vacuumed by a rotating blade or other cutters. This discharge port often communicates with some form of collecting device, such as a bag. However, many times it is more convenient for the user to simply allow the material to discharge to the ground. Unfortunately, removing the collecting device from the discharge port tends to expose the blade as well as allowing the debris to be propelled into the air at high velocities.

To guard the blade and to prevent airborne debris, one approach is to simply cover the discharge port with a plate. This keeps the debris within the blade housing or mower deck until the debris falls to the ground. While this may be desirable for such applications as mulching, in general, it interferes with the proper operation of the blade and makes the debris difficult to remove when employed extensively.

A more generally desirable approach is to provide the discharge port with a fixed deflector the allows the debris to exit the mower deck, but deflects the debris toward the ground. In this way, the debris is not repeatedly struck by the blade, nor is the debris airborne. This allows excellent performance, especially when mowing wet and/or high vegetation.

While a fixed deflector provides adequate performance with respect to the debris, it presents a major problem when trying to mow closely to obstacles on the deflector side of the mower. Typically, this requires that all mowing close to obstacles be done on the opposite side of the mower deck. As a result, mowing around objects must be done in one direction (e.g. counterclockwise) and all mowing next to a fence or wall must be approached from a single direction.

In addition, a fixed deflector may present problems when mowing on uneven ground. In these conditions, the deflector may dig into the ground, uprooting turf or even damaging the mower/deflector. Also it would be advantageous if it was possible to install a bagger on the mower without first removing the deflector.

SUMMARY OF THE INVENTION

The present invention is a close-trim deflector for a mower. The deflector comprises a hinging member pivotably attachable to the mower; a deflecting member attached to the hinging member, the deflecting member being pivotable about the hinging member between a maximum discharge position and a minimum clearance position; and biasing means acting on the deflecting member and the mower to urge the deflecting member toward the maximum discharge position.

By allowing the deflector to pivot between the maximum discharge position and the minimum clearance position, the mower can mow close to obstacles on the deflector side of the mower. The operator simply runs the leading edge of the deflector in the maximum discharge position against the obstacle, causing the deflector to swing back out of the way toward the minimum clearance position. In addition, if a portion of the deflector snags the ground, the deflector swings out of the way.

The biasing means may comprise a coil spring having two ends, one end being attached to the deflecting member and the other end being attachable to the mower.

A further improved close-trim deflector is claimed, wherein the deflecting member is also pivotable about the hinging member between a normal orientation including the maximum discharge position and the minimum clearance position and a raised orientation, the biasing means also acting to urge the deflecting member toward the normal orientation.

Allowing the deflector to pivot up as well as backward provides the ability to swing the deflector out of the way for mounting a bagger onto the mower discharge port without removing the deflector. In addition, the capability to pivot up further improves the deflector's ability to move out of the way of obstacles or ground snags.

The hinging member may comprise a T-shaped member having a shaft portion and a cross portion. The shaft and cross portions each act as hinge pins.

The deflector may also comprise a slotted portion that pivotably engages the shaft portion in the normal orientation and is disengaged therefrom in the raised orientation. This improves the strength and stability of the deflector.

The deflector may also comprise means to latch the deflecting means in the minimum clearance position. This allows the mower to be stored or transported in a minimum of space.

DESCRIPTION OF THE PREFERRED EMBODIMENTS

Figure 1:
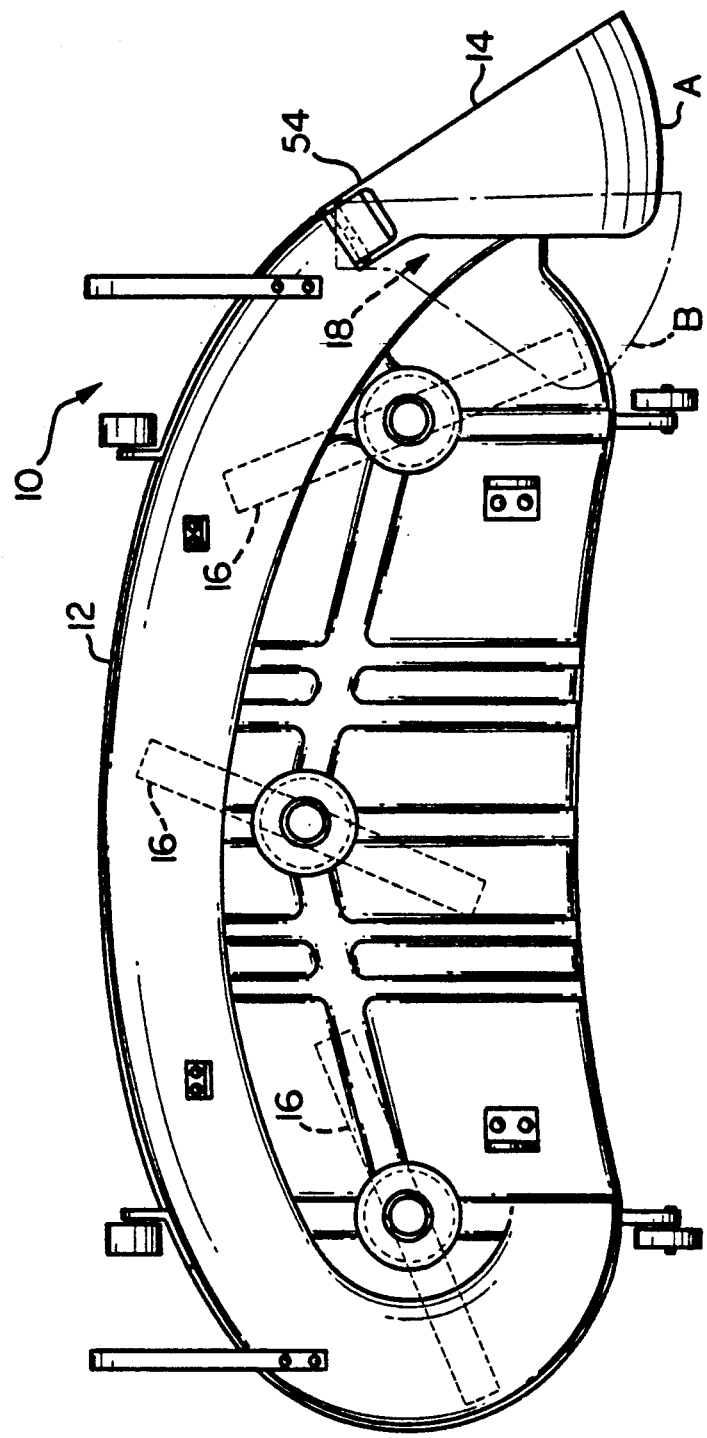
FIG. 1 is a top plan view of a mower deck and deflector according to the invention.
Figure 2:
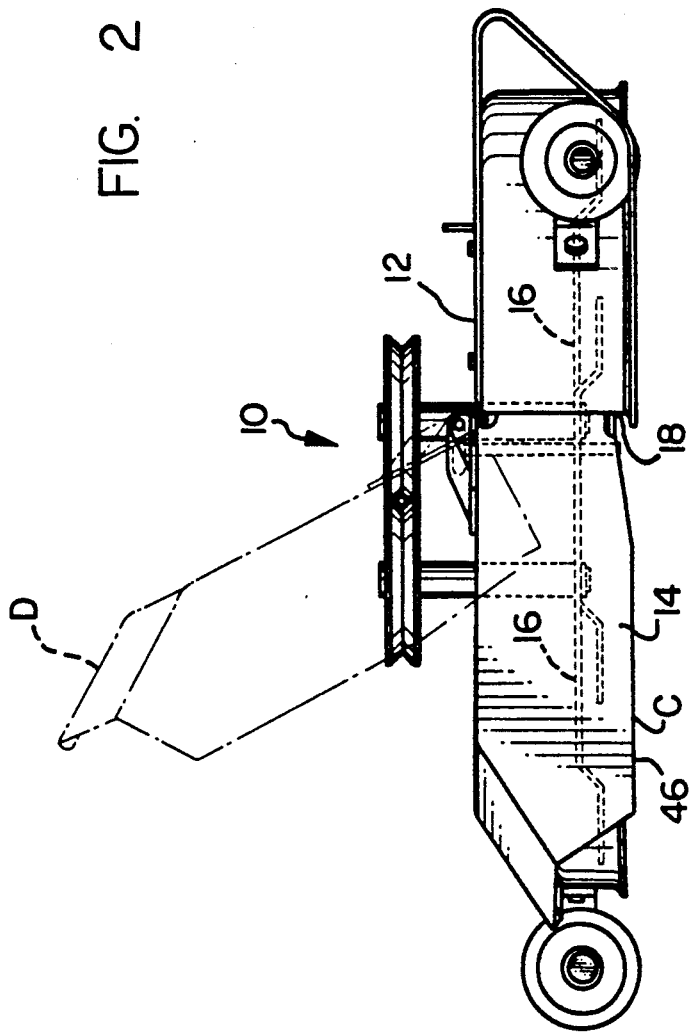
FIG. 2 is a right-side elevation view of the mower deck and deflector of FIG. 1.

Referring to FIGS. 1 and 2, a mower deck/deflector assembly 10 is shown. The assembly 10 may be advantageously suspended and driven from a vehicle such as a lawn tractor (not shown). Alternatively, the assembly 10 may be adapted to be a portion of a walk-behind mower.

The assembly 10 comprises a mower deck 12 and a deflector 14. The mower deck 12 has one or more revolving cutting blades 16. A discharge port 18 is provided in the side wall of the mower deck 12.

The deflector 14 is hinged to the mower deck 12. The deflector 14 may be swung from a maximum discharge position "A" and a minimum clearance position "B" (FIG. 1). In addition, in the preferred embodiment of the invention, the deflector may be also swung from a normal orientation "C" and a raised orientation "D" (FIG. 2).

Figure 3:
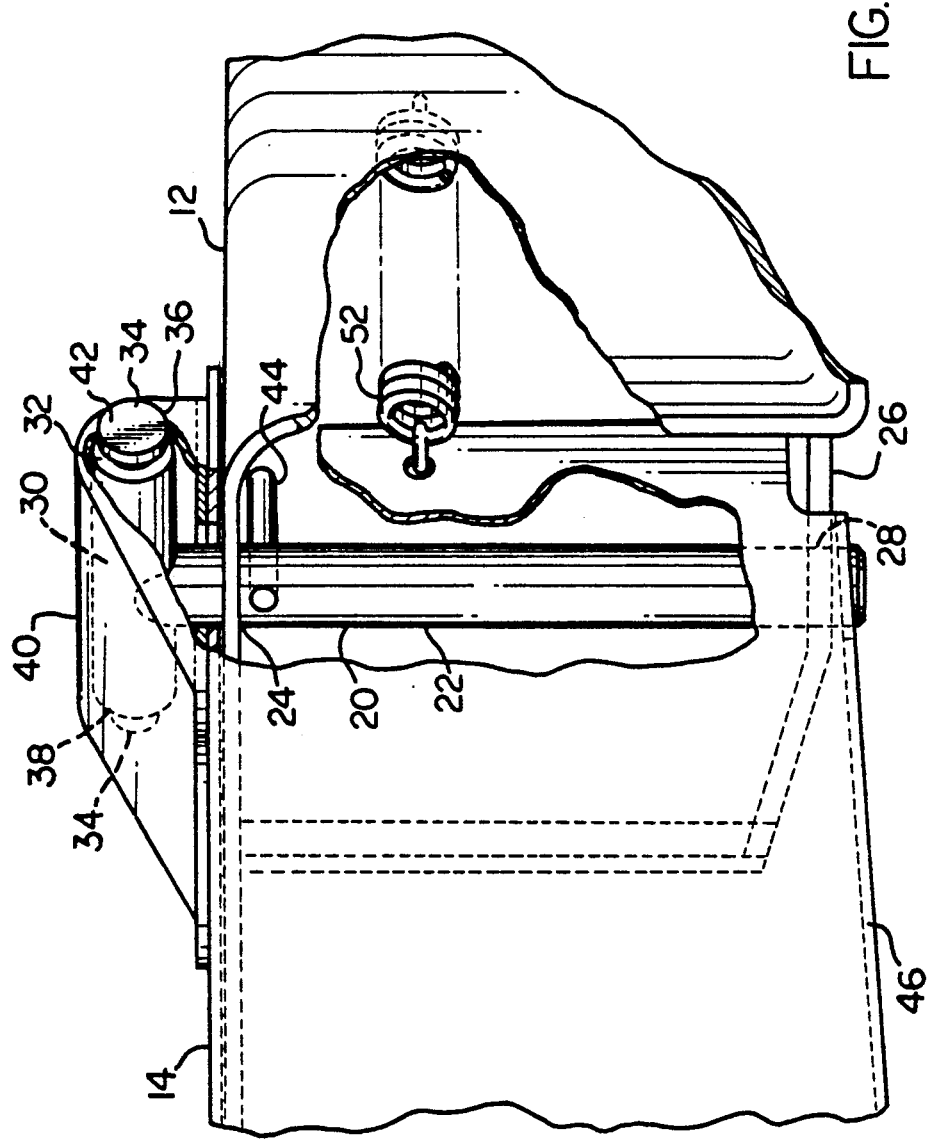
FIG. 3 is a partial right-side elevation view of the mower deck and deflector of FIG. 1 with portions cut away.

In the preferred embodiment, a T-swivel 20 (FIG. 3) hingably attaches the deflector 14 to the mower deck 12. The shaft portion 22 of the T-swivel 20 extends through a hole 24 in the top of the mower deck 12 near the leading edge 25 of the discharge port 18. A mounting projection 26 (FIG. 4) extends underneath the mower deck 12 from the sidewall thereof near the leading edge 25 of the discharge port 18. The bottom portion of the shaft 22 extends through and beyond a hole 28 in the projection 26. The shaft 22 acts as a hinge pin to allow the T-swivel 20 to rotate with respect to the mower deck 12 in the horizontal plane (i.e. the plane of the maximum discharge position "A" and the minimum clearance position "B").

The T-swivel 20 is provided with a cross portion 30 which includes a sleeve 32 attached largely perpendicular to the top end of the shaft portion 22. The cross portion 30 also includes a pin 34 extending through the sleeve 32 and the holes 36, 38 in a mounting bracket 40 attached to the deflector 14. The pin 34 retains the deflector 14 on the T-swivel 20 and allows the deflector 14 to be rotated out of the horizontal plane, or normal orientation "C", up to the raised orientation "D".

The pin 34 may be held in place, for example, by a head 42 at one end and a Cotter pin (not shown) at the other, or it may be press fit either into the sleeve 32 or the bracket 40.

Alternately, the cross portion 30 may be simply a rod attached to the top end of the shaft 22 and the deflector 14 pivoted directly about the rod.

In addition, if no up and down movement of the deflector 14 is desired, it can be simply hinged about the shaft 22.

In the preferred embodiment, the shaft 22 may be advantageously retained in the housing 12 by a roll pin 44 inserted through the shaft 22 near the hole 24 on the inside of the mower deck 12.

Figure 4:
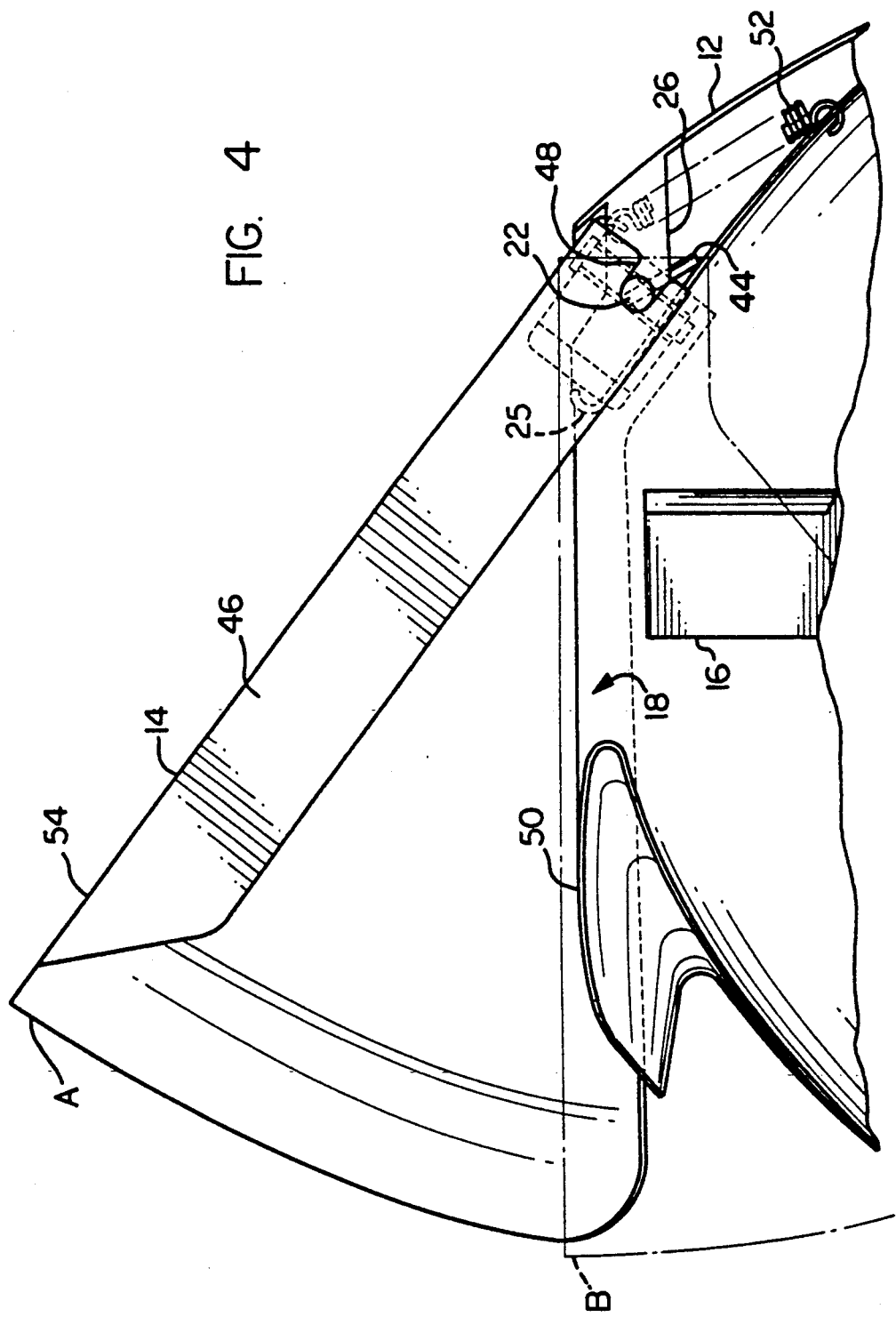
FIG. 4 is a partial bottom plan view of the mower deck and deflector of FIG. 1.

The roll pin 44 may be employed to further advantage by orienting it as shown in FIG. 4. By having a portion of the pin 44 extending from the shaft 22, the maximum discharge position "A" of the deflector 14 is determined by the end of the pin 44 striking a portion of the mower deck 12, thereby limiting further travel.

In the preferred embodiment, the deflector 14 is provided with a lip 46 along its bottom edge. The lip has a slot 48 near the leading edge that engages the bottom end of the shaft 22 when the deflector 14 is in the normal orientation "C", that is, anywhere in the plane of the maximum discharge position "A" and the minimum clearance position "B". When the deflector 14 is raised toward the raised orientation "D", the slot 48 disengages from the shaft 22. When the deflector 14 is in the minimum clearance position "B", the lip 46 extends under the trailing edge 50 of the discharge port 18.

A coil spring 52 is attached between the deflector 14 and the mower deck 12 such that the deflector is urged toward the maximum discharge position "A". The spring 52 both biases the deflector 14 down from the raised orientation "D" to the normal orientation "C" and from the minimum clearance position "B" to the maximum discharge position "A".

In operation, the blades 16 fling and blow the debris out of the discharge port 18. In general, the deflector 14 will be in the maximum discharge position "A" and the debris will travel along the inside of the deflector 14 and be directed to the ground next to the mower as it travels along.

However, if the deflector leading edge 54 strikes any obstacle in the path of the mower, the deflector 14 is swung back towards the minimum clearance position "B". This allows the mower to mow as close on the deflector side as on the opposite side of the mower deck 12. While the discharge port 18 is largely obstructed in the minimum clearance position "B", this temporary trapping of the debris is acceptable during the limited amount of time required for mowing around obstacles.

In addition, if the deflector 14 snags on uneven ground, the deflector can move towards the raised orientation "D", as well as back towards the minimum clearance position "B".

If it is desired to install a bagger on the mower, the deflector 14 can be manually raised to the raised orientation "D", thereby giving access to the discharge port 18 for attaching a bagger.

Figure 5:
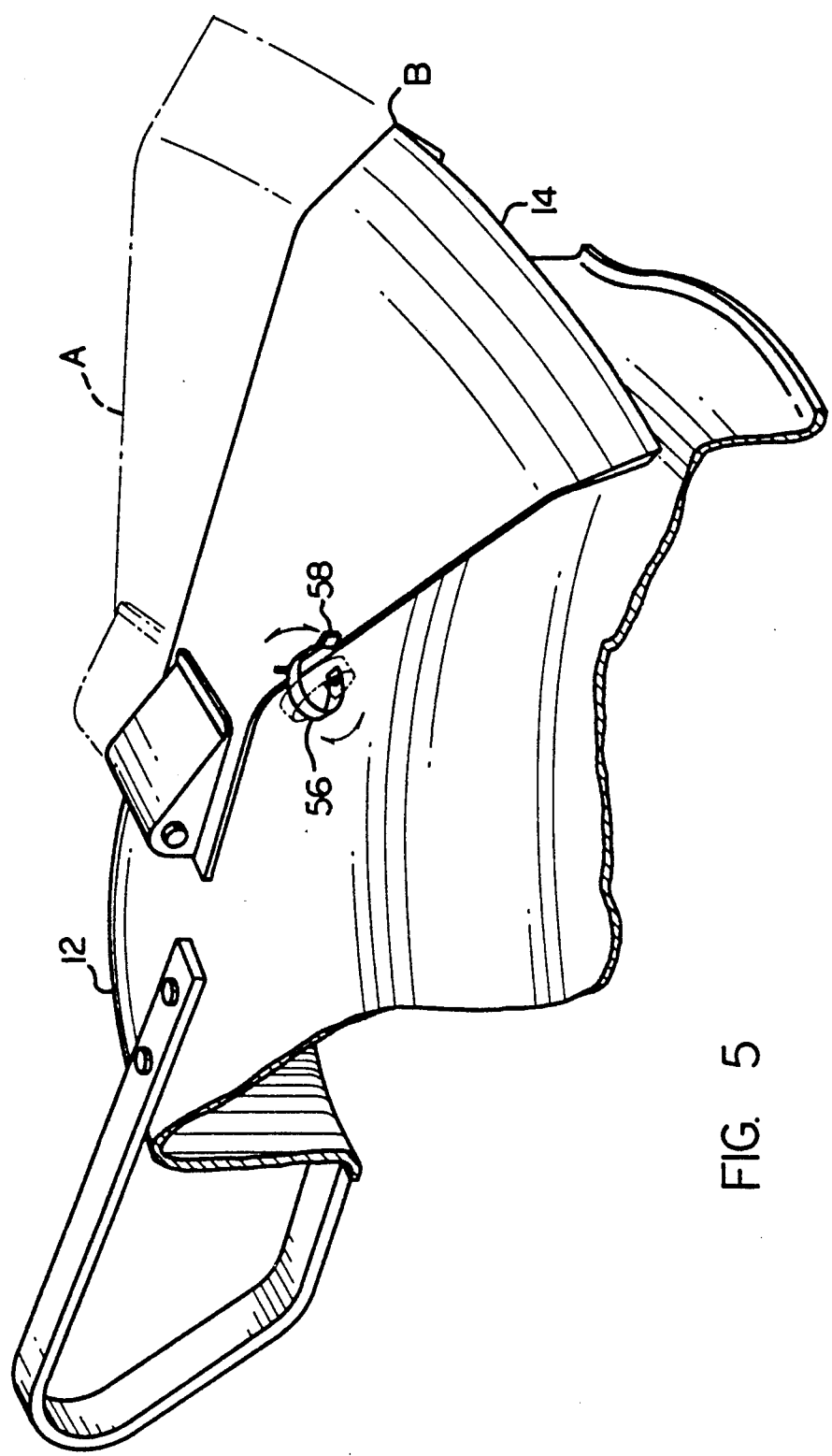
FIG. 5 is a partial perspective view of a mower deck and deflector according to the invention showing a latch for latching the deflector in the minimum-clearance position.

An additional embodiment of the invention is shown in FIG. 5. A spring latch 56 is rotatably mounted on the mower deck 12 and a catch 58 is attached to the deflector 14. The latch 56 and the catch 58 are mounted such that when the deflector 14 is moved to the minimum clearance position "B", the deflector 14 can be retained in that position by moving the end of the latch 56 over the catch 58.

Latching the deflector 14 in the minimum clearance position "B" allows for storing the assembly 10 in a minimum of space, as well as assisting in maneuvering the mower in a tight storage space. In addition, the deflector can be latched in the minimum clearance position "B" to produce a mulching effect while mowing.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A close-trim deflector for a mower, said deflector comprising:
    a hinging member having first and second hinge axes, said hinging member being pivotably attachable to said mower about said first hinge axis;
    a deflecting member pivotably attached to said hinging member about said second hinge axis, said deflecting member being pivotable with said hinging member between a maximum discharge position and a minimum clearance position and being also pivotable about said hinging member between a normal orientation including said maximum discharge position and said minimum clearance position and a raised orientation; and
    biasing means acting on said deflecting member and said mower to urge said deflecting member toward said maximum discharge position, said biasing means also acting to urge said deflecting member toward said normal orientation, wherein said hinging member comprises a T-shaped member having a shaft portion and a cross portion, said shaft portion and said cross portion acting as said first and second hinge axes, respectively.

2. A deflector according to claim 1, wherein said biasing means comprises a coil spring having two ends, one end being attached to said deflecting member and the other end being attachable to said mower.

3. A deflector according to claim 1, further comprising means to latch said deflecting member in said minimum clearance position.

4. A deflector according to claim 1, wherein said deflecting member comprises a slotted portion, said slotted portion being pivotably engaged with said shaft portion in said normal orientation and being disengaged from said shaft portion in said raised orientation.

5. A mower comprising:
  a mower deck;
  a hinging member having first and second hinge axes, said hinging member being pivotably attached to said mower deck about said first hinge axis;
  a deflecting member pivotably attached to said hinging member about said second hinge axis, said deflecting member being pivotable with said hinging member between a maximum discharge position and a minimum clearance position and being also pivotable about said hinging member between a normal orientation including said maximum discharge position and said minimum clearance position and a raised orientation; and
  biasing means acting on said deflecting member and said mower deck to urge said deflecting member toward said maximum discharge position, said biasing means also acting to urge said deflecting member toward said normal orientation, wherein said hinging member comprises a T-shaped member having a shaft portion and a cross portion, said shaft portion and said cross portion acting as said first and second hinge axes, respectively.

6. A mower according to claim 5, wherein said biasing means comprises a coil spring attached between said deflecting member and said mower deck.

7. A mower according to claim 5, further comprising means to latch said deflecting member in said minimum clearance position.

8. A mower according to claim 5, wherein said deflecting member comprises a slotted portion, said slotted portion being pivotably engaged with said shaft portion in said normal orientation and being disengaged from said shaft portion in said raised orientation.

9. A mower comprising:
  a mower deck;
  a T-shaped member having a shaft portion and a cross portion, said T-shaped member being pivotably attached to said mower deck;
  a deflecting member having a slotted portion, said deflecting member being attached to said T-shaped member and being pivotable about said shaft portion between a maximum discharge position and a minimum clearance position and pivotable about said cross portion between a normal orientation including said maximum discharge position and said minimum clearance position and a raised orientation, said slot being pivotably engaged with said shaft portion in said normal orientation and being disengaged from said shaft portion in said raised orientation; and
  a coil spring attached between said deflecting member and said deck, said spring urging said deflecting member toward said normal orientation and said maximum discharge position.

10. A mower according to claim 9, further comprising means to latch said deflecting means in said minimum clearance position.

* * * * *